United States Patent [19]

Jackson et al.

[11] Patent Number: 4,873,568

[45] Date of Patent: Oct. 10, 1989

[54] DIGITAL VIDEO EFFECTS APPARATUS

[75] Inventors: Richard A. Jackson; John Abt; Ronnie D. Barnett, all of Nevada City, Calif.

[73] Assignee: The Grass Valley Group, Inc., Nevada City, Calif.

[21] Appl. No.: 246,054

[22] Filed: Sep. 19, 1988

[51] Int. Cl.⁴ .................... H04N 5/272; H04N 5/275
[52] U.S. Cl. ...................................... 358/22; 358/183
[58] Field of Search ................. 358/183, 22, 181, 182, 358/21 R, 160; 340/730, 724, 791

[56] References Cited

U.S. PATENT DOCUMENTS

| 4,694,343 | 9/1987 | Flora | 358/22 |
| 4,694,344 | 9/1987 | Flora | 358/183 |
| 4,758,892 | 7/1988 | Bloomfield | 358/182 |
| 4,805,022 | 2/1989 | Abt | 358/183 |
| 4,823,183 | 4/1989 | Jackson | 358/183 |

Primary Examiner—Tommy P. Chin
Attorney, Agent, or Firm—John Smith-Hill

[57] ABSTRACT

A digital video effects apparatus comprises an input for receiving a digital input video signal representing the distribution of optical information over a video field, and a key signal generator for providing a digital key signal that defines an area of the video field. A mask signal generator provides a digital mask signal that defines at least a portion of said area of the video field. The digital mask signal is combined with the digital key signal to provide a modified digital key signal, and the input video signal is acted on in accordance with the modified key signal to provide an output video signal.

27 Claims, 4 Drawing Sheets

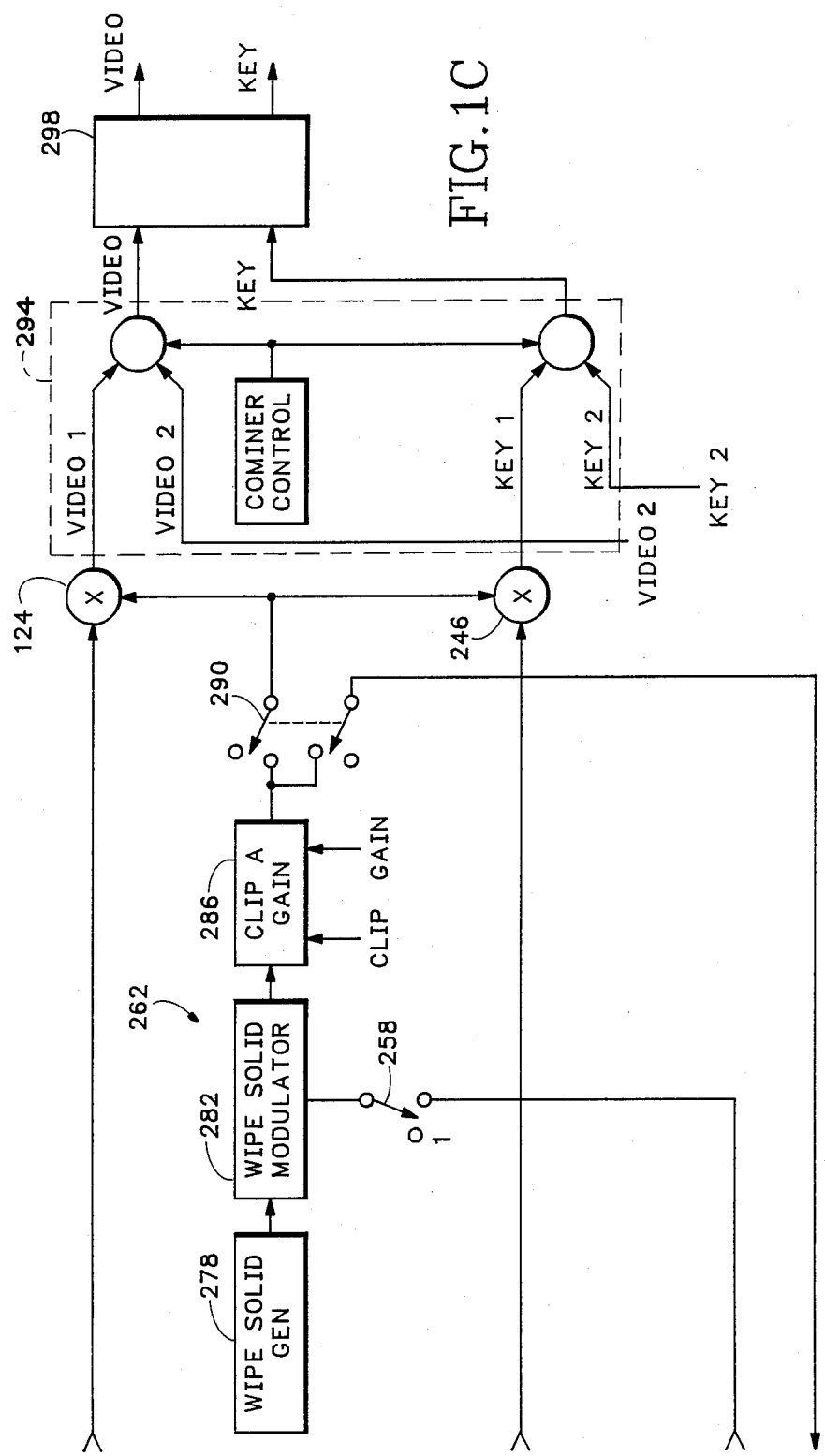

DIGITAL VIDEO EFFECTS APPARATUS

BACKGROUND OF THE INVENTION

This invention relates to a digital video effects apparatus.

In the digital effects apparatus that is sold by The Grass Valley Group, Inc. under the trademark Kaleidoscope, it is possible to apply certain effects only to selected areas of the video field. For example, effects that are known as input recursive effects, bitmap effects, mosaics and defocus can be applied in predetermined areas of the field. The area in which the selected effect does not take place is defined by a mask signal, which is off (logical 0) where the effect is to be inhibited and is on (logical 1) where the effect is to be allowed.

The Kaleidoscope video effects apparatus operates in the shaped video domain, in which a video signal is multiplied by an associated crop (or key) signal that defines an area of the video field. The crop signal may, for example, be generated by a luminance key generator or a rectangle generator that forms part of the video effects apparatus. In some effects (mosaics and defocus) the crop signal is used as the mask signal because it allows use of a luminance key signal or a rectangle signal to define the area over which the effect is inhibited. However, in order to preserve the crop information for subsequent use, e.g. unshaping the video signal, it is necessary for a device that uses the crop signal as a mask signal to regenerate the crop signal. Input recursive and bitmap effects employ mask signals that are different from the crop signal, and therefore do not necessitate regeneration of the crop signal.

SUMMARY OF THE INVENTION

A preferred embodiment of the present invention in a first aspect is a digital video effects apparatus comprising input means for receiving a digital input video signal representing the distribution of optical information over a video field. A video bus, which propagates the video signal from the input means, includes at least first and second operating devices each having an input terminal for receiving a video signal over the video bus, an output terminal for providing an output signal on the video bus, and a control terminal for receiving a control signal that acts on the video signal received at the input terminal in order to provide the video signal at the output terminal, the input terminal of the first operating device being coupled to the input means and the output terminal of the first operating device being coupled to the input terminal of the second operating device. At least first and second processors receive respective input control signals each representing the distribution of an input control function over the video field and provide respective output control signals representing the distribution of a output control function over the video field. Each processor has a modulation input terminal for receiving an modulation signal that represents the distribution of a modulating function over the video field, whereby the output control function is related to the input control function by at least the modulating function. Means are operative selectively to apply the output control signals provided by the first and second processors to the control terminals of the first and second operating devices respectively. A spatial pattern generator generates a pattern signal that represents a boundary between two portions of the video field, and a control bus has an input terminal connected to the spatial pattern generator for receiving the pattern signal and has at least first and second output terminals. Means are operative selectively to connect the first and second output terminals of the control bus to the modulation input terminals of the first and second processors respectively.

A preferred embodiment of the present invention in a second aspect is a method and apparatus for processing a digital input video signal representing the distribution of optical information over a video field. A digital key signal that defines an area of the video signal a digital mask signal that defines at least a portion of the area defined by the key signal are provided. The digital mask signal and the digital key signal are combined to provide a modified digital key signal, and the first input video signal is acted on in accordance with the modified key signal to provide an output video signal.

BRIEF DESCRIPTION OF THE DRAWINGS

For a better understanding of the invention, and to show how the same may be carried into effect, reference will now be made, by way of example, to the accompanying drawings, in which:

FIGS. 1A, 1B and 1C, taken together, are a simplified block diagram of a digital video effects apparatus embodying the present invention.

DETAILED DESCRIPTION

Figure 1A:
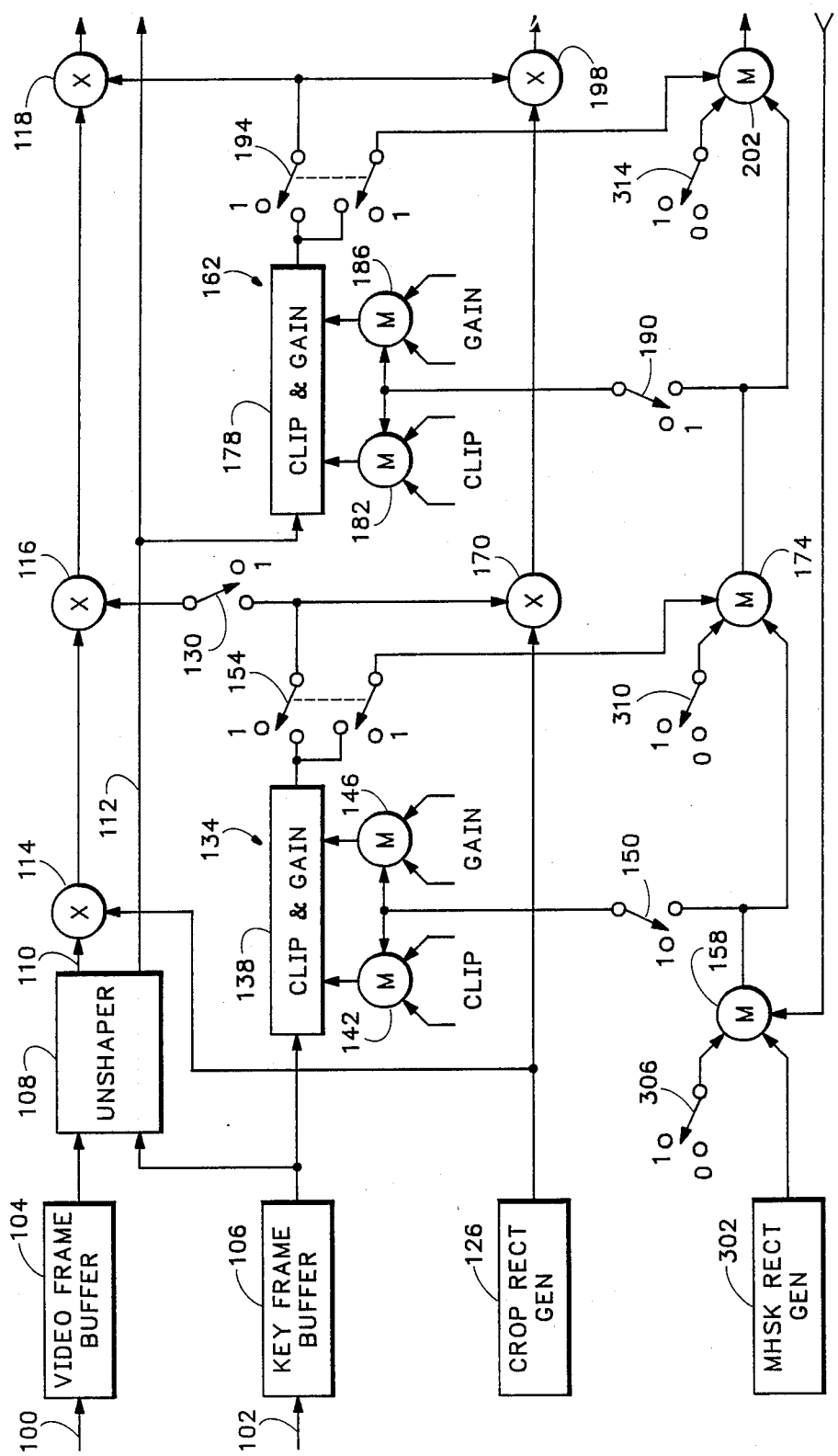
Figure 1B:
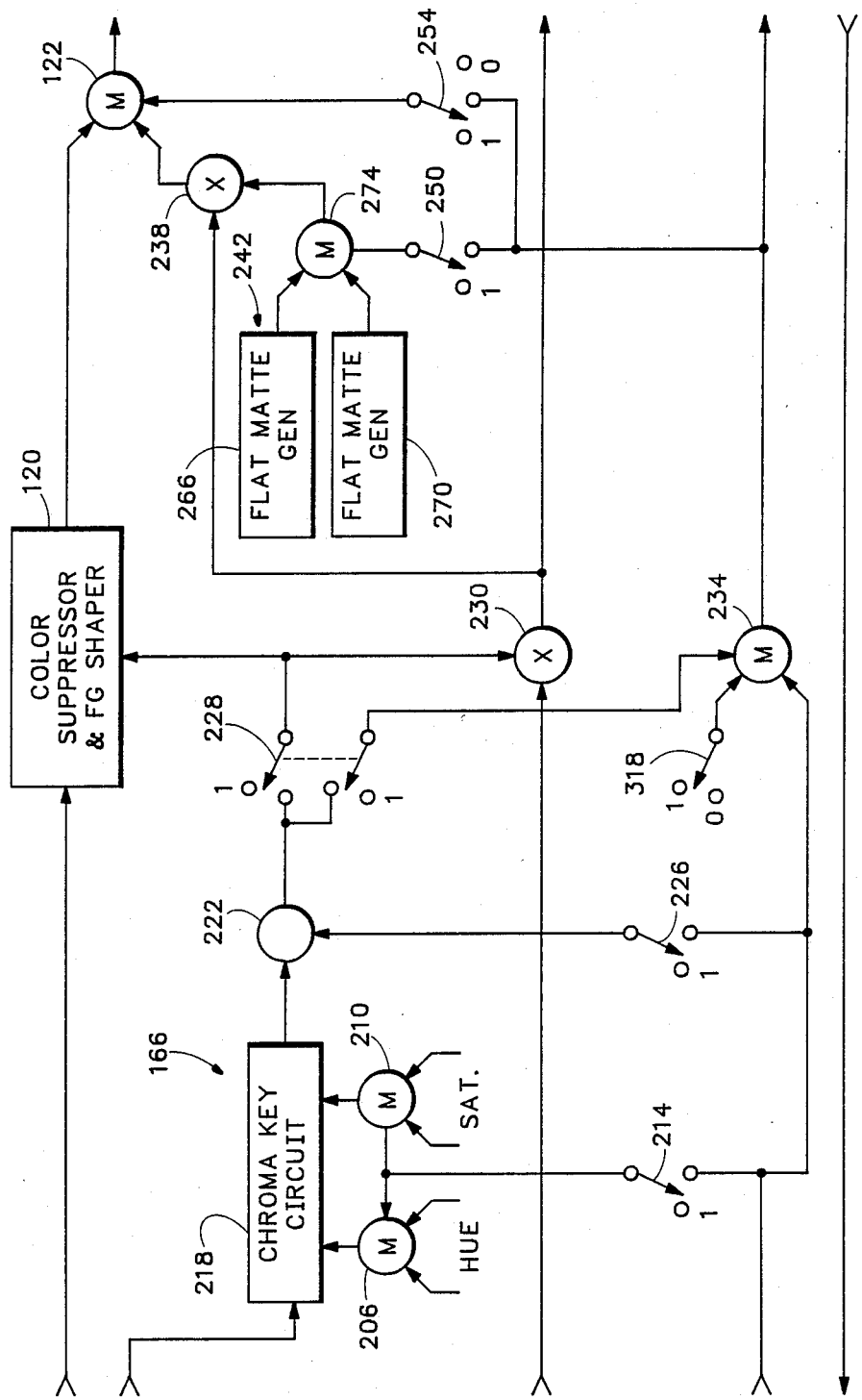

The illustrated digital video effects apparatus has a video input terminal 100 at which a video signal is received in digital form. The signal received at the terminal 100 might be received in digital form from other apparatus, or it might be received in analog form and converted to digital form in the illustrated apparatus by an analog-to-digital converter (not shown). The video signal may be either shaped or unshaped, as discussed in copending patent application Ser. No. 06/836,945 filed Mar. 6, 1986, the disclosure which is hereby incorporated by reference herein. A second signal is received at a terminal 102. The second signal may be a video signal, but if the signal received at the terminal 100 is shaped, the signal received at the terminal 102 is the key signal associated with the shaped video signal. Since the signal received at the terminal 102 serves a keying function, it is referred to as hereinafter as a key signal. The key signal might be received in digital form from other apparatus, or it might be received in analog form and converted to digital form in the illustrated apparatus.

The video signal and the key signal (if present) are applied to respective frame buffers 104 and 106 in order to bring the signals into proper time relationship. The output signal of the video frame buffer 104 is applied to an unshaper 108, which receives the output signal of the key frame buffer 106, and provides two output video signals on lines 110 and 112 respectively. If the input signal is shaped, the signal on the line 112 is generated by unshaping the video signal, in the manner described in the above-mentioned copending application, and the signal on the line 110 is the shaped video signal. If the input video signal is unshaped, unshaped video signals are provided on the lines 110 and 112.

The signal on the line 110 is applied successively to a picture crop multiplier 114, an external key multiplier 116, a luminance key multiplier 118, a color suppressor and foreground shaper 120, a matte fill mixer 122, and a wipe key multiplier 124. The multipliers 114, 116, 118 and 124, the color suppressor and foreground shaper 116 and the mixer 122, which are used to perform effects, might be designed to act on a video signal having a different range from the signal received at the terminal 100, in which event the unshaper converts the video signal that it receives from the frame buffer to the proper range.

The picture crop multiplier 114 receives a crop rectangle signal, which is generated by a crop rectangle generator 126 and defines a rectangular area within the video field, at its second input. Accordingly, the video signal provided by the picture crop multiplier 114 to the external key multiplier 116 is spatially limited by the crop rectangle. The second input of the multiplier 116 is connected to a switch 130.

The key signal received at the terminal 102 is applied through the key frame buffer 106 to an external key generator 134. The external key generator 134 provides an external key signal, which may be used in performing effects. The devices that receive the external key signal might be designed to act on a key signal that has a different range from the signal received at the terminal 102, in which event the external key generator converts its input signal to the proper range.

The external key generator 134 comprises a clip and gain circuit 138, which may be of the form described in copending patent application Ser. No. 06/931,382 filed Nov. 14, 1986. The clip and gain circuit acts on the key signal in accordance with a clip level and gain factor applied to the clip and gain circuit by mixers 142 and 146 respectively. The mixers 142 and 146 receive clip levels and gain factors that are selected by the operator to achieve a desired effect and combine them under control of a mix control signal received from a switch 150 to provide the clip level and gain factor that are applied to the clip and gain circuit. The output signal of the clip and gain circuit 138 is the external key signal, and is applied to a switch 154.

The switch 154 has a mask position (upper position shown in FIG. 1A) and a crop position (lower position). In the crop position, the switch 154 applies the external key signal to the switch 130 and also applies it to a crop bus multiplier 170, and applies a logical 1 to the control input of a mask bus mixer 174. The multiplier 170 also receives the crop rectangle signal provided by the crop rectangle generator 126, and therefore the output signal provided by the multiplier 170 is the intersection of the crop rectangle and the external key signal. In the mask position, the external key signal is applied to the mixer 174 and a logical 1 is applied to the switch 130 and the multiplier 170.

In the event that the video signal received at the terminal 100 is shaped, the clip levels applied to the mixer 142 are each zero and the gain factors applied to the mixer 146 are each one, and the mix control signal received from the switch 150 is logical 1, and therefore the external key signal corresponds to the key signal received at the terminal 102, adjusted to the proper range. The switch 130 is set to apply a logical 1 to the second input of the multiplier 116, and therefore the output signal of the multiplier 116 is the shaped video signal, limited by the crop rectangle. The switch 154 may be in either its mask position or its crop position.

If the video signal received at the terminal 100 is unshaped, the operator selects clip levels and gain factors for the mixers 142 and 146 and may set the switch 150 to receive a mask signal from a mask bus mixer 158.

The mask signal may be, for example, a horizontal ramp, so that the external key signal provided by the clip and gain circuit 138 represents a linear transition across the field from the output signal provided in response to one pair of clip and gain values to the output signal provided in response to the other pair of clip and gain values. In this case, the switch 154 is placed in its crop position and the external key signal provided by the external key generator 134 is applied through the switches 154 and 130 to the second input of the external key multiplier 116, and therefore the multiplier 116 shapes the output signal of the multiplier 114 using the external key signal.

The illustrated apparatus also comprises a luminance key generator 162, which performs a level-sensitive keying operation, in that it generates a key signal that depends on the level of a video signal. It is normal that the key signal generated by a luminance key generator depends only on the luminance of the video signal. However, the level of a shaped video signal depends on both the luminance of the corresponding unshaped video signal and on the level of the associated key signal, and therefore, for example, a shaped video signal that is 50% gray and fully opaque has the same level as a signal that is 100% white and 50% transparent. Therefore, the video signal that is applied to the luminance key generator 162 is the unshaped video signal provided on the line 112. A chroma key generator 166 also performs a level-sensitive keying operation and for similar reasons receives the unshaped video signal.

If the luminance key generator 162 is active, it generates a luminance key signal that depends on the luminance of the unshaped video signal received on the line 112. In areas of high luminance, the luminance key signal is logical 1 and in areas of low luminance, the luminance key signal is logical 0.

The luminance key generator 162 is similar to the external key generator 134, in that it comprises a clip and gain circuit 178 and two mixers 182 and 186. The clip and gain circuit provides an output signal that reflects application of the clip level and gain factor provided by the mixers 182 and 186 respectively to the luminance level of the unshaped video signal. The mixers 182 and 186 each receive a mix control signal from a switch 190. The mix control signal may be either logical 1 or a mask signal provided by the mixer 174. As will be explained below, the mask signal can have any one of a wide range of waveforms. If, for example, it is desired that the luminance key generator respond to a given luminance level in a different fashion at the top and bottom of the field respectively, the operator can select two sets of clip levels and gain factors and cause the mixer 174 to provide a mask signal having a vertical ramp waveform. The output signal of the clip and gain circuit 178, which is the luminance key signal, is a result of applying a linear mix between the clip levels and a linear mix between the gain factors to the luminance level of the video signal.

The luminance key signal is applied to a switch 194 having a mask position and a crop position. In the crop position, the luminance key signal is applied to a crop bus multiplier 198 and to the luminance key multiplier 118 and a logical 1 is applied to the control input of a mask bus mixer 202. In the mask position of the switch 194, the luminance key signal is applied to the control input of the mixer 202, and the multipliers 118 and 198 each receive a logical 1 and therefore pass their respective input signals unchanged.

The chroma key generator 166 provides a chroma key signal that depends on the chrominance of the unshaped video signal. For example, the chroma key generator may be used to generate a key signal from an unshaped foreground video signal that represents a foreground subject in front of a solid blue screen. In such a case, it is generally desired that the key signal be logical 0 for points of the video signal that represent the blue of the screen and be logical 1 elsewhere. The chroma key signal is used to control combination of the foreground video signal with a signal representing a background scene: in the output signal, the area for which the key signal is logical 0 is provided by the background signal and the area for which the key signal is logical 1 is provided by the foreground signal.

The chroma key generator comprises a hue mixer 206 which receives two input hue values and provides an output hue value, which depends on the input hue values and a mix control signal, and also comprises a saturation mixer 210 which receives two input saturation values and provides an output saturation value, which depends on the two input saturation values and the mix control signal. Thus, the output hue and saturation values represent a linear mix between one pair of hue and saturation values and the other pair of hue and saturation values. The mixers 206 and 210 receive mix control signals from a switch 214. The mix control signal may be either logical 1 or a mask signal provided by the mask bus mixer 202. The output hue and saturation values are applied to a chroma key circuit 218, which also receives the unshaped video signal and provides an output signal that is logical 0 for areas of the field for which the hue and saturation values correspond to the hue and saturation values provided by mixers 206, 210 and is logical 1 elsewhere. If, in the example discussed above, the blue screen appears to be a slightly different color at one edge of the field from the other edge (for example due to lighting effects), by selecting one pair of input hue and saturation values for one edge of the field and another pair of input hue and saturation values for the other edge of the field, and employing the mixer 202 to apply a horizontal ramp to the mixers 206 and 210 by way of the switch 214, it is possible for the operator to cause the chroma key circuit to be responsive to a chrominance value that changes across the field.

The output signal of the chroma key circuit 218 is applied as operand input to a logical operator circuit 222, which receives an operator input from a switch 226, which is connected to the mixer 202. The logical operator circuit 222 may perform any of numerous logical operations on the output signal of the chroma key circuit 218, using the signal received by way of the switch 226, in order to provide the chroma key signal. For example, if the signal received by way of the switch 226 is logical 1 over the field except for a circle in which it is logical 0, and the logical operation is an intersection, the chroma key signal is forced to zero within the circle and outside the circle corresponds to the output signal of the circuit 218.

The chroma key signal is applied to a switch 228, which has a mask position and a crop position. In the crop position of the switch 228, the chroma key signal is applied to a crop bus multiplier 230, which receives the output of the multiplier 198, and to the color suppressor and foreground shaper 120, and a logical 1 is applied to the control input of a mask bus mixer 234. The color suppressor and foreground shaper receives a shaped video signal from the multiplier 118 and detects those areas of the scene represented by the shaped video signal which are of a selected color. In the case of the example, the selected color would be the blue of the screen. The color suppressor and foreground shaper converts the areas of the scene that are of the selected color to grey, and performs an intersection with the chroma key signal received from the switch 228. In the mask position of the switch 228, the chroma key signal is applied to the control input of the mixer 234, and the multiplier 230 and the color suppressor and foreground shaper 120 each receive a logical 1. The multiplier 230 passes its input signal unchanged. The color suppressor and foreground shaper performs its color suppressor operation, and the intersection operation has an effect on the video signal.

The output signal of the multiplier 230 is applied to both a matte fill multiplier 238, which also receives a signal provided by a matte fill generator 242, and a crop bus multiplier 246.

The mask bus mixer 234 provides a mask signal which is applied to switches 250, 254 and 258, which are connected respectively to the matte fill generator 242, the multiplier 122 and a wipe key generator 262. The matte fill generator 242 comprises two flat matte generators 266, 270, representing different respective colors, whose output signals are mixed by a mixer 274 under control of the signal received from the switch 250. If the switch 250 selects the mask signal provided by the mixer 234, and the operator causes the mask signal to be a vertical ramp, the matte fill generator will generate a matte signal that represents a vertical wash from one color to the other.

The output signal of the matte fill generator 242 is applied to the multiplier 238, which limits the matte signal in accordance with the key signal provided by the multiplier 234, and the limited matte signal is mixed with the shaped video signal provided by the color suppressor and foreground shaper 120 in the mixer 122. The mixer 122 receives its mix control signal from the switch 254. The mix control signal can be logical 1 (pass shaped video unchanged), logical 0 (replace shaped video with shaped matte, optionally modulated by the mask signal) or the mask signal (replace shaped video with shaped matte selectively, in accordance with the mask signal).

The wipe key generator 262 comprises a wipe solid generator 278, a wipe solid modulator 282 and a clip and gain circuit 286. The switch 258 can select logical 1 or the mask signal provided by the mixer 234. In the event that the switch selects logical 1, the wipe solid provided by the wipe solid generator 278 is applied unchanged to the clip and gain circuit. If the switch 258 selects the mask signal, the wipe solid is modulated in accordance with the mask signal before being applied to the clip and gain circuit. The output signal of the clip and gain circuit 286 is a wipe key signal and may be considered to define a boundary between two parts of the field. The shape of the boundary is determined by the input signal received by the clip and gain circuit 286, and its position and softness are determined by the clip level and gain factor applied by the clip and gain circuit. Numerous different waveforms, such as vertical and horizontal ramps, circles and squares, can be generated using a wipe key generator. The boundary defined by the wipe key signal can be translated under operator control. The boundary may define a closed figure, and in this case the size of the figure can be enlarged or reduced under operator control. The manner in which the wipe key generator operates is described in copending patent application No. 07/158,827 filed Feb. 19, 1988. The wipe key signal provided by the wipe key generator 262 is applied to a switch 290, which has a mask position and a crop position. In the mask position, the wipe key signal is applied to the control input of the mixer 158, and the switch 290 applies a logical 1 to the multipliers 124 and 246. In the crop position, the switch 290 applies the wipe key signal to the multipliers 124 and 246 and applies a logical 1 to the control input of the mixer 158. It will be appreciated that timing of the operation of the wipe key generator 262 must be adjusted depending on whether the wipe key signal is applied to the crop bus multiplier 246 or the mask bus mixer 158.

The shaped video signal and its associated key signal, provided by the multipliers 124 and 246 respectively, are applied to a video combiner 294 which also receives a second video signal and its associated key signal. In the context of the weather forecast discussed previously, the multiplier 124 would provide the signal representing the forecaster against a blue background (suppressed to grey), and second video signal would be the signal provided by the character generator. The accompanying key signal associated with the second video signal would be a uniform logical 1 throughout the field. The combiner combines the two video signals and the two keys in the manner described in patent application Ser. No. 06/836,945, and provides as its output a single shaped video signal and an associated key signal. The video signal and key signal provided by the combiner 294 are applied to an output processor 298, which may unshape the video signal using the associated key signal, add a background matte to any areas of the field that are not occupied by the video signal, and convert the range of the video signal to the range used in other apparatus. If the video signal is to be applied to apparatus that utilizes a key signal, the output processor converts the key signal to the appropriate range and provides an output key signal also. The combiner and output processor may, for example, be of the kind employed in the Kaleidoscope digital video effects apparatus.

Figure 2A:
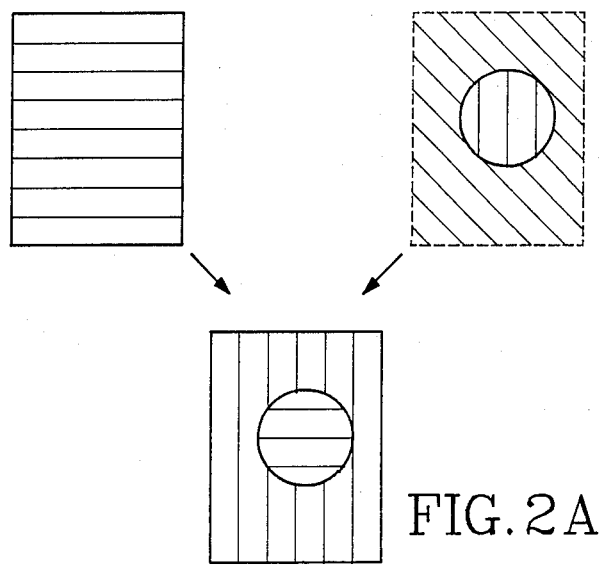
FIGS. 2A and 2B illustrate portions of the respective video fields as an aid to understanding the invention.
Figure 2B:
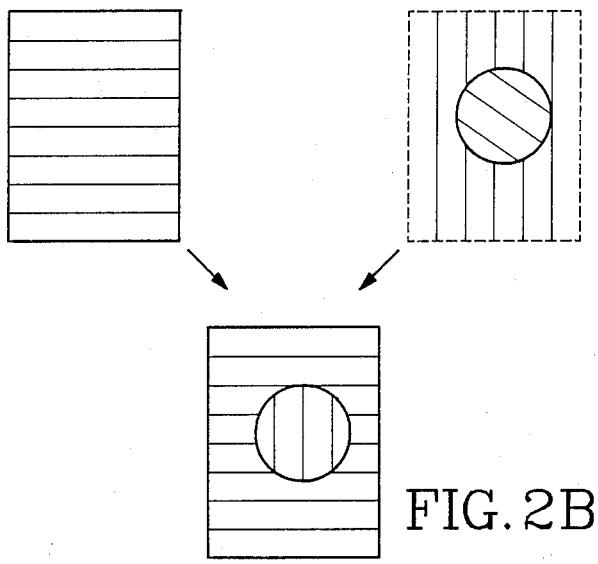

As noted previously, the mask bus mixer 158 receives its mix control input from the switch 290. The mixer receives its signal inputs from a mask rectangle generator 302, which generates a signal that defines a rectangular area of the video field, and a force/inhibit switch 306, which can select either a logical 1 or a logical 0. The output signal Mask out provided by the mixer 158 is given by the following equation:

Mask out = Mask in*Control + Force/inhibit*(1-Control)

where Mask in is the signal received from the mask rectangle regenerator, Control is the signal received from the switch 290, and Force/inhibit is the signal received from the switch 306. It will therefore be seen that if the switch 290 is in the crop position, so that Control is 1, the mask rectangle signal is passed unchanged by the mixer 192. In this case, the mask signal provided by the mixer 158 simply defines a limited area of the video field. On the other hand, if the switch 290 is in the mask position and the force/inhibit switch 306 selects logical 0, the mixer 158 performs an intersection operation on the wipe key signal and the mask rectangle. In this case, the mask signal is logical 0 outside the mask rectangle and conforms to the wipe key signal inside the mask rectangle. If the mask rectangle is coextensive with the crop rectangle, the wipe key generator 262 may then cause the mask signal to be, for example, a vertical or horizontal ramp over the entire field. If the switch 290 is in the mask position and the switch 306 selects logical 1, the output signal of the mixer 158 is logical 1 for points on one side of the boundary defined by the wipe key signal and is the mask rectangle signal for points on the other side of the boundary. For example, FIGS. 2A and 2B illustrate the effect of mixing a mask rectangle signal (horizontal shading) with a wipe key signal defining a circle. In the case of FIG. 2A, the wipe key signal has a value of logical 1 (vertical shading) inside the circle and logical 0 (diagonal shading) outside the circle, whereas FIG. 2B illustrates the effect that is achieved when the wipe key signal is logical 0 inside the circle and logical 1 outside the circle.

The mask signal provided by the mixer 158 is applied to one of the signal inputs of the mixer 174 and to the switch 150. The switch 150 can select either the mask signal provided by the mixer 158 or logical 1. If the switch 150 selects logical 1, only one pair of clip and gain values is effective. Otherwise, the clip and gain values applied to the clip and gain circuit are a linear mix between the two pairs of values that are applied to the mixers 142 and 146, and the external key signal is the result of applying this linearly mixed pair of values to the input key signal. For example, if the operator wished to inhibit the effect of the input key signal over a selected area of the field, this could be accomplished by setting one pair of clip and gain values to the normal values for the desired effect and the other pair of clip and gain values so that the external key signal is the same as the input key signal when that pair of values is selected, using the mask rectangle generator 302 to define the selected area of the field, setting the switch 290 to the crop position and using the switch 150 to select the output of the mixer 158. As the mask signal changes from logical 1 to logical 0 across the boundary of the selected area of the field, the external key signal blends between the result of applying the normal pair of clip and gain values to the input key signal and the input key signal itself.

The mixer 174 receives the mask signal provided by the mixer 158 as one signal input and receives a logical 1 or logical 0, selected by a force/inhibit switch 310, as its other signal input. The switch 154 provides the mix control input for the mixer 174, and the output signal of the mixer 174 is applied to the mixer 202 and can be applied to the luminance key generator 162 through the switch 190.

The mixers 202 and 234 are connected to the outputs of the mixers 174 and 202 respectively, force/inhibit switches 314 and 318, and the switches 194 and 228. The mask signal provided by the mixer 234 may be applied to the matte fill generator 242, the matte insert mask mixer 122 or the wipe key generator 262. The latter connection is not permitted if the switch 290 is in the crop position.

The switches 154, 194, 228 and 290 allow the key signals provided by the respective key generators 134, 162, 166 and 262 to be used either to limit the key signal provided by the crop rectangle generator 126 or to control the mixing of the mask signal provided by the mask rectangle generator 302 with logical 1 or logical 0. In the event that the latter function is selected, the mask signal is applied to a subsequent key generator or the matte fill generator, whose output signal is used to limit the key signal.

By use of the illustrated apparatus, it is possible to override selectively the normal operation of a key generator. For example, in the context of a chroma key generator, it is possible to use the crop rectangle generator 126 to define a template at an area in the field at which the blue screen shows through in the background. Regardless of the operation of the multipliers 170 and 198, the output signal of the multiplier 230 will be logical 0 within that area. Therefore, when the video signal provided by the multiplier 124 is combined with background video signal under control of the key signal provided by the multiplier 246, the foreground signal will be forced to 0 within the area of the template and the background signal will be occupy that area. Alternatively, if there are blue elements in the foreground subject and those blue elements should not be eliminated, the wipe key generator 262 may be used to generate a signal defining an area that contains those blue elements. This signal can then be used to inhibit the chroma key generator within the area defined by the wipe key signal, with the result that the background scene does not appear at the location of the blue elements. This may be achieved, for example by applying the wipe key signal through the mixers 158, 174 and 202 and the switch 226 to the logical operator circuit 222, which is set to perform a union operation. Over the visible area of the blue screen, the output signal of the chroma key circuit 218 is logical 0 and over the area of the foreground subject, except the blue elements, the output signal of the chroma key circuit is logical 1. Over the area of the blue elements, the mask signal is logical 1 and is logical zero elsewhere. Therefore, the chroma key signal is logical 0 over the visible area of the blue screen and is logical 1 elsewhere, including over the blue elements of the foreground subject.

In the illustrated apparatus, the mask rectangle generator 302 and the key generators 134, 162, 166 and 262 are potential mask signal generators, while the key generators 134, 162, 166 and 262, the matte fill generator 242 and the matte fill mixer 122 are potential mask signal users. By connecting the switch 290 to the mixer control input of the mixer 158, instead of connecting the mask rectangle generator 302 directly to the mixer 174, a wider range of effects can be achieved, since the wipe key generator can be placed at the beginning of the mask bus when it functions as a mask signal generator while it remains at the end of the mask bus when it functions as a mask user.

It will be appreciated that the invention is not restricted to the particular embodiment that has been described, and that variations may be made therein without departing from the scope of the invention as defined in the appended claims and equivalents thereof. For example, the order in which the mask signal generators and the mask signal users appear in the signal flow is not critical. The order that is selected is chosen to place mask signal generators upstream of mask signal users. In the described embodiment of the invention, the wipe key generator can function either as a mask signal generator or as a mask signal user, whereas the external, luminance and chroma key generators can each function simultaneously as both a mask signal generator and a mask signal user, and their positions in the sequence of users and generators cannot readily be adjusted.

We claim:

1. A digital video effects apparatus comprising:

(a) input means for receiving a digital input video signal representing the distribution of optical information over a video field,
    (b) means for providing a digital key signal that defines an area of the video field,
    (c) means for providing a digital mask signal that defines at least a portion of said area of the video field,
    (d) means for combining the digital mask signal with the digital key signal and providing a modified digital key signal, and
    (e) output means for acting on the input video signal in accordance with the modified key signal to provide an output video signal.

2. Apparatus according to claim 1, wherein the input means comprise means for receiving first and second digital input video signals each representing the distribution of optical information over a video field, and the output means comprise means for combining the first and second input video signals under control of the modified key signal.

3. Apparatus according to claim 1, wherein the means for providing a digital mask signal comprise means for providing a first digital mask signal that defines a first region of the video field, means for providing a second digital mask signal that defines a second region of the video field, and means for combining the first and second mask digital signals to provide said digital mask signal.

4. Apparatus according to claim 3, wherein the means for combining the first and second digital mask signals comprise a mixer having a first signal input terminal connected to receive the first digital mask signal, a second signal input terminal connected to receive a selected logical signal, and a mix control input terminal connected to receive the second digital mask signal.

5. Apparatus according to claim 1, wherein the means for providing a digital key signal comprise means for providing a first digital signal that defines a region of the video field, means for providing a second digital signal that defines a second region of the video field, and means for combining the first and second digital signals to provide said digital key signal.

6. Apparatus according to claim 5, wherein the means for combining the first and second digital signals comprise a multiplier.

7. Apparatus according to claim 1, comprising a mixer having a first signal input terminal connected to receive the digital mask signal, a second signal input terminal connected to receive a selected logical signal, and a mix control input terminal, and the apparatus also comprises switch means selectively operable to apply the digital key signal either to the means for combining the digital mask signal with the digital key signal or to the control input terminal of the mixer.

8. Apparatus according to claim 1, wherein the means for providing a digital key signal comprise an external key generator for receiving a key signal and providing an external key signal in response thereto.

9. Apparatus according to claim 1, wherein the means for providing a digital key signal comprise a crop rectangle generator for providing a digital key signal that defines a rectangular area of the video field.

10. Apparatus according to claim 1, wherein the means for providing a digital key signal comprise a luminance key generator for receiving a video signal and providing a luminance key signal, the level of which depends on the luminance of the video signal.

11. Apparatus according to claim 1, wherein the means for providing a digital key signal comprise a color-selective key generator for receiving a video signal and generating a chrominance key signal that depends on the chrominance of the video signal.

12. Apparatus according to claim 1, wherein the means for providing a digital key signal comprise a wipe key generator for providing a wipe key signal that defines a boundary between two areas of the video field.

13. Apparatus according to claim 1, wherein the means for providing a digital key signal comprise means for providing at least first and second digital signals and means for combining the first and second digital signals in a selected fashion to provide the digital key signal.

14. Apparatus according to claim 1, wherein the means for providing a digital mask signal comprise a mask rectangle generator for providing a signal that defines a rectangular portion of said area of the video field.

15. Apparatus according to claim 1, wherein the means for providing a digital mask signal comprise an external key generator for receiving a digital key signal and providing an external key signal in response thereto and means for combining the external key signal with at least one other digital signal to provide the digital mask signal.

16. Apparatus according to claim 1, wherein the means for providing a digital mask signal comprise a mask rectangle generator for providing a first digital signal, which defines a rectangular area of the video field, and means for combining the first digital signal with at least one other digital signal to provide the digital mask signal.

17. Apparatus according to claim 1, wherein the means for providing a digital mask signal comprise a luminance key generator for receiving a video signal and providing a digital luminance key signal, the level of which depends on the luminance of the video signal, and means for combining the luminance key signal with at least one other digital signal to provide the digital mask signal.

18. Apparatus according to claim 1, wherein the means for providing a digital mask signal comprise a color-selective key generator for receiving a video signal and generating a digital chrominance key signal that depends on the chrominance of the video signal, and means for combining the chrominance key signal with at least one other digital signal to provide the digital mask signal.

19. Apparatus according to claim 1, wherein the means for providing a digital mask signal comprise a wipe key generator for providing a wipe key signal that defines a boundary between two areas of the video field, and means for combining the wipe key signal with at least one other signal to provide the digital mask signal.

20. Apparatus according to claim 1, wherein the means for providing a digital mask signal comprise means for providing first and second digital signals and means for combining the first and second digital signals in a selected fashion to provide the digital mask signal.

21. Apparatus according to claim 1, comprising means for receiving the digital mask signal and generating a spatially varying video signal in response thereto, and means for combining the spatially varying video signal with the input video signal.

22. A digital video effects apparatus comprising:

(a) input means for receiving a digital input video signal representing the distribution of optical information over a video field, (b) a video bus for propagating the digital input video signal from the input means, the video bus including at least first and second operating devices each having an input terminal for receiving the digital input video signal over the video bus, an output terminal for providing a digital output video signal on the video bus, and a control terminal for receiving a control signal that acts on the digital input video signal received at the input terminal in order to provide the digital output video signal at the output terminal, the input terminal of the first operating device being coupled to the input means and the output terminal of the first operating device being coupled to the input terminal of the second operating device, (c) at least first and second processors for receiving respective input control signals each representing the distribution of an input control function over the video field and providing respective output control signals representing the distribution of an output control function over the video field, each of the processors having a modulation input terminal for receiving a modulation signal that represents the distribution of the modulating function over the video field, whereby the output control function is related to the input control function by at least the modulation function, (d) means operative selectively to apply the output control signals provided by the first and second processors to the control terminals of the first and second operating devices respectively, (e) a spatial pattern generator for generating a pattern signal that represents a boundary between two portions of the video field, (f) a control bus having an input terminal connected to the spatial pattern generator for receiving the pattern signal and having at least first and second output terminals, and (g) means operative selectively to connect the first and second output terminals of the control bus to the modulation input terminals of the first and second processors respectively.

23. Apparatus according to claim 22, wherein the first and second operating devices comprise respective multipliers.

24. Apparatus according to claim 22, wherein at least one of the first and second processors comprise a device selected from the group consisting of an external key generator, a luminance key generator, a chrominance key generator, and a wipe key generator.

25. Apparatus according to claim 22, wherein the spatial pattern generator comprises a wipe key generator.

26. Apparatus according to claim 22, further comprising:

(h) a crop bus having a first input terminal for receiving an input key signal defining an area of the video field, a second input terminal for receiving the output control signal of the first processor, and means for combining the signals received at the first and second input terminals to provide a modified key signal, and (i) means for acting on the digital video signal in accordance with the modified key signal to provide an output video signal.

27. A method of carrying out a video effect employing a digital input video signal representing the distribution of optical information over a video field, comprising:
(a) providing a digital key signal that defines an area of the video field,
(b) providing a digital mask signal that defines a portion of said area of the video field,
(c) combining the digital mask signal with the digital key signal and providing a modified digital key signal, and
(d) acting on the digital input video signal in accordance with the modified key signal to provide an output video signal.

* * * * *